(12) United States Patent
Lan et al.

(10) Patent No.: US 9,184,665 B2
(45) Date of Patent: Nov. 10, 2015

(54) CONTROL CIRCUIT OF POWER CONVERTER WITH TEMPERATURE CONTROL AND METHOD FOR CONTROLLING POWER CONVERTER

(71) Applicants: Chien-Tung Lan, Taipei (TW); Ta-Yung Yang, Milpitas, CA (US)

(72) Inventors: Chien-Tung Lan, Taipei (TW); Ta-Yung Yang, Milpitas, CA (US)

(73) Assignee: SYSTEM GENERAL CORP., Taipei (TW)

( * ) Notice: Subject to any disclaimer, the term of this patent is extended or adjusted under 35 U.S.C. 154(b) by 30 days.

(21) Appl. No.: 14/069,380

(22) Filed: Nov. 1, 2013

(65) Prior Publication Data

US 2014/0126250 A1      May 8, 2014

Related U.S. Application Data

(60) Provisional application No. 61/721,576, filed on Nov. 2, 2012.

(51) Int. Cl.
*H02M 11/00* (2006.01)
*H02M 3/335* (2006.01)
*H02M 1/32* (2007.01)

(52) U.S. Cl.
CPC .... *H02M 3/33507* (2013.01); *H02M 2001/327* (2013.01)

(58) Field of Classification Search
USPC ............................................ 363/21.12–21.17
See application file for complete search history.

(56) References Cited

U.S. PATENT DOCUMENTS

| 5,408,401 | A | * | 4/1995 | Miyazaki | 363/21.08 |
| 7,149,098 | B1 | * | 12/2006 | Chen | 363/56.09 |
| 2007/0236197 | A1 | * | 10/2007 | Vo | 323/282 |

FOREIGN PATENT DOCUMENTS

CN           102005731          4/2011

OTHER PUBLICATIONS

"Office Action of China Counterpart Application", issued on Sep. 6, 2015, pp. 1-7, in which the listed reference was cited.

* cited by examiner

*Primary Examiner* — Adolf Berhane
*Assistant Examiner* — Nusrat Quddus
(74) *Attorney, Agent, or Firm* — Jianq Chyun IP Office

(57) ABSTRACT

A control circuit of a power converter and a method for controlling the power converter are provided. The control circuit of the power converter comprises a switching circuit and a temperature-sensing device. The switching circuit generates a switching signal in response to a feedback signal, and the switching circuit generates a current-sensing signal for regulating an output of the power converter. The temperature-sensing device generates a temperature signal in response to temperature of the temperature-sensing device.

10 Claims, 7 Drawing Sheets

US 9,184,665 B2

CONTROL CIRCUIT OF POWER CONVERTER WITH TEMPERATURE CONTROL AND METHOD FOR CONTROLLING POWER CONVERTER

CROSS REFERENCE TO RELATED APPLICATION

This application claims the priority benefits of U.S. provisional application Ser. No. 61/721,576, filed on Nov. 2, 2012. The entirety of the above-mentioned patent applications is hereby incorporated by reference herein and made a part of this specification.

BACKGROUND OF THE INVENTION

1. Field of the Invention

The present invention relates to techniques for regulating the output of a power converter, and particularly relates to a s circuit and a method with temperature control for regulating the output current/power of power converters.

2. Background of the Invention

In battery charge applications, the output power of the power adaptor is generally restricted by the temperature of the power adaptor. In order to achieve a quick charge for the battery, a large current for charging could be applied to the battery by the power adaptor when the temperature is low. While the temperature of the power adaptor increases, the output current for the power adaptor would gradually decrease in response to the temperature increase. A limit value of temperature must be applied to the power adaptor to ensure safety of the power adaptor. This technique for controlling the output current or power for the power adaptor by the temperature could provide an efficient way for battery charging.

SUMMARY OF THE INVENTION

The present invention provides a control circuit of a power converter with temperature control for regulating the output current of the power converter. The control circuit of the power converter comprises a switching circuit and a temperature-sensing device. The switching circuit generates a switching signal in response to a feedback signal, and the switching circuit generates a current-sensing signal for regulating an output of the power converter. The temperature-sensing device generates a temperature signal in response to temperature of the temperature-sensing device.

From another point of view, the present invention provides a method for controlling a power converter. The method comprises the following steps: generating a switching signal in response to a feedback signal, and generating a current-sensing signal for regulating an output of the power converter; generating a temperature signal in response to temperature of a temperature-sensing device; when the value of the temperature signal is higher than a limit value of temperature, linearly modulating the switching signal according to the temperature signal.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DETAILED DESCRIPTION OF EMBODIMENTS

Figure 1:
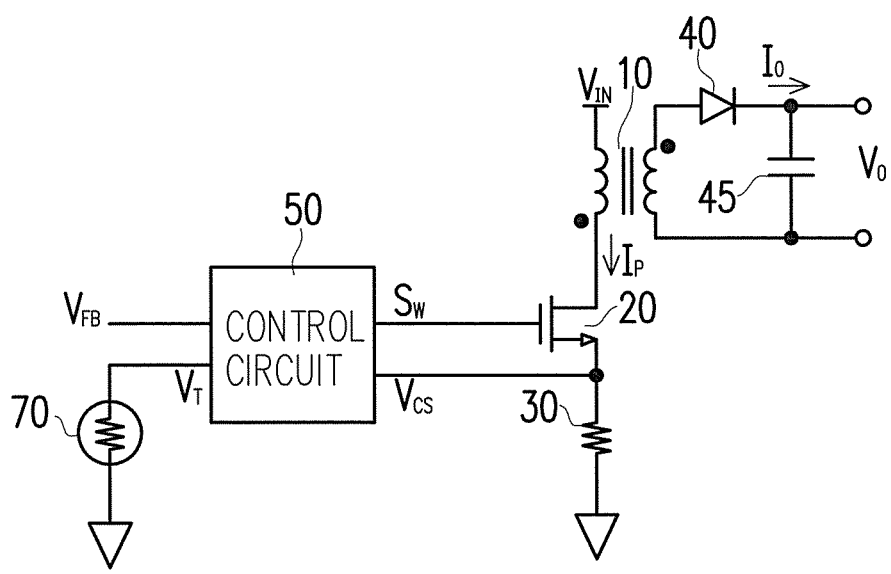
FIG. 1 shows a circuit diagram illustrating a power converter according to one embodiment of the present invention.

FIG. 1 shows a circuit diagram illustrating a power converter according to one embodiment of the present invention. The power converter comprises a control circuit 50, a temperature-sensing device 70, a resistor 30, a transformer 10, a transistor 20, a rectifier 40, and a capacitor 45. The control circuit 50 generating a switching signal $S_W$ in accordance with a feedback signal $V_{FB}$. The switching signal $S_W$ is configured to switch a transformer 10 through a transistor 20, and the transformer 10 generates an output $V_O$ through a rectifier 40 and a capacitor 45. When the transistor 20 is turned on, a primary current $I_P$ of the transformer 10 will generate a current-sensing signal $V_{CS}$ at a current-sensing resistor 30. The current-sensing signal $V_{CS}$ is further coupled to the control circuit 50 for generating the switching signal $S_W$. A temperature-sensing device 70, such as a thermal resistor, generates a temperature signal $V_T$ to the control circuit 50 for the temperature control and protection. The temperature signal $V_T$ is configured to response the temperature of the temperature-sensing device 70. When the temperature of the power converter increases and reaches a limit value of temperature, the control circuit 50 controls the switching signal $S_W$ to decrease the output current $I_O$ of the power converter. The output current $I_O$ is inversely proportional to the increase of the temperature. In other words, the temperature signal is configured for linearly modulating the switching signal when the temperature of the power converter is higher than the limit value of temperature.

Figure 2:
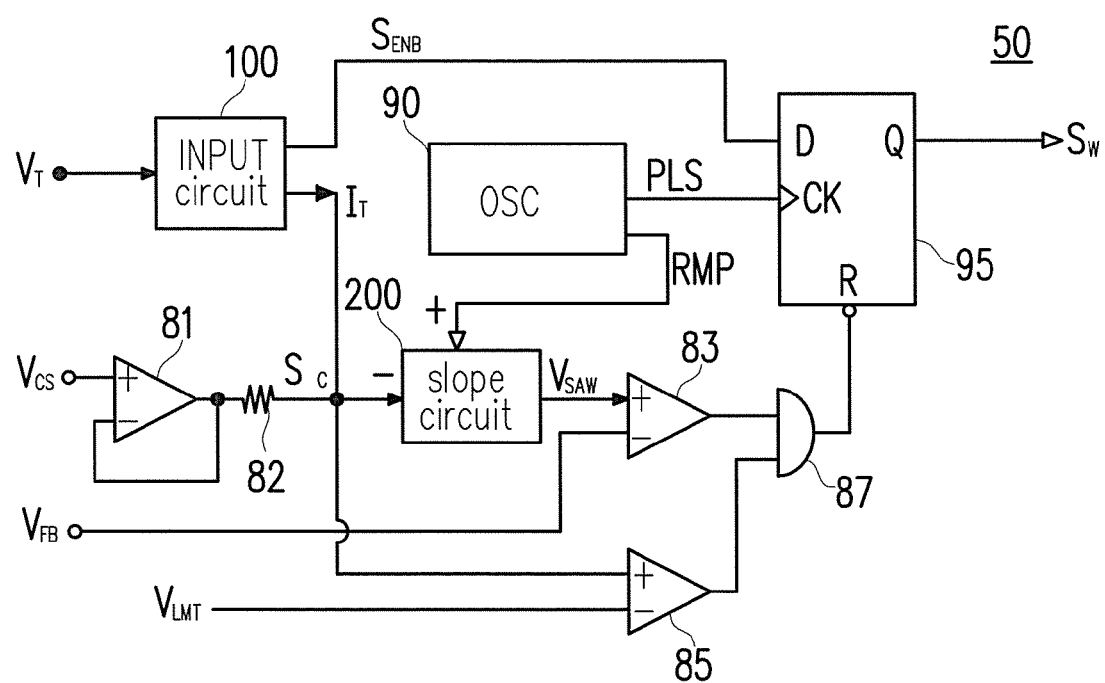
FIG. 2 shows a circuit diagram illustrating the control circuit of the power converter according to one embodiment of the present invention.

FIG. 2 shows a circuit diagram illustrating parts of the control circuit 50 of the power converter according to one embodiment of the present invention. The control circuit 50 comprises a switching circuit and a temperature-sensing device 70 in FIG. 1. The switching circuit comprises an oscillator (OSC) 90, a flip-flop 95, a slope circuit 200, an AND gate 87 and comparators 83 and 85 for generating the switching signal $S_W$. The oscillator 90 generates a clock signal PLS to turn on the flip-flop 95, and if a signal $S_{ENB}$ is enabled, the flip-flop 95 generates the switching signal $S_W$. The signal $S_{ENB}$ is disabled while the temperature of the thermal resistor 70 reaches a limit value of temperature. The oscillator 90 also generates a ramp signal RMP to the slope circuit 200 for generating a saw-tooth signal $V_{SAW}$. Once the switching signal $S_W$ is turned on, the current of the transformer 10 in FIG. 1 will generate the current-sensing signal $V_{CS}$ coupled to a buffer amplifier 81. The output of the buffer amplifier 81 is coupled to the slope circuit 200 though a resistor 82 for generating a modulated signal $S_C$ by the buffer amplifier 81 and generating the saw-tooth signal $V_{SAW}$ by the slope circuit 200. The saw-tooth signal $V_{SAW}$ is generated in response to the ramp signal RMP and the modulated signal $S_C$. The modulated signal $S_C$ is generated in accordance with the current-sensing signal $V_{CS}$ and a current signal $I_T$. The current signal $I_T$ is generated in accordance with the temperature signal $V_T$ in an input circuit 100 when the temperature of the temperature-sensing device 70 is higher than the limit value of temperature. The input circuit 100 further generates the signal $S_{ENB}$ that is coupled to the flip-flop 95.

The comparator 83 is configured to reset the flip-flop 95 and disable the switching signal $S_W$ through the AND gate 87 when the saw-tooth signal $V_{SAW}$ is higher than the feedback signal $V_{FB}$. Furthermore, the comparator 85 is coupled to turn off the switching signal $S_W$ when the modulated signal $S_C$ is higher than a threshold/limit temperature voltage $V_{LMT}$.

Figure 3:
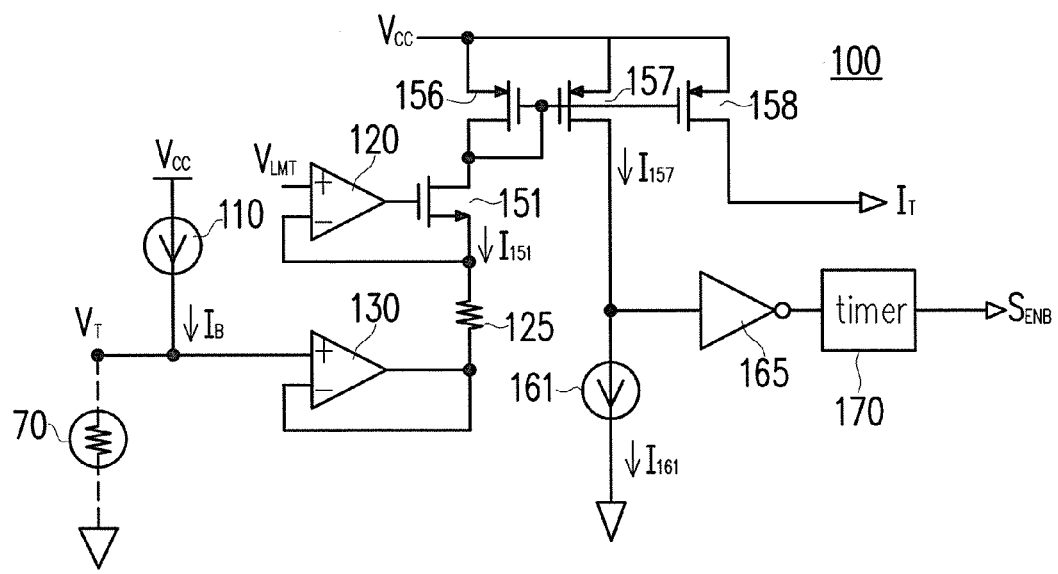
FIG. 3 shows a circuit diagram illustrating the input circuit of the control circuit according to one embodiment of the present invention.

FIG. 3 shows a circuit diagram illustrating the input circuit 100 of the control circuit 50 according to one embodiment of the present invention. The input circuit 100 comprises current sources 110 and 161, a buffer 120, a unit-gain buffer 130, transistors 151, 156, 157, and 158, an inverter 165 and timer 170. The current source 110 and the temperature-sensing device 70 generate the temperature signal $V_T$ coupled to a unit-gain buffer 130. A current $I_{151}$ is generated by a transistor 151 in accordance with a limit temperature voltage $V_{LMT}$, the temperature signal $V_T$ and the resistor 125 through the buffer 120, the unit-gain buffer 130, and the transistor 151. The current $I_{151}$ can be expressed as formula (1).

$$I_{151} = \frac{V_{LMT} - V_T}{R_{125}} \qquad (1)$$

In formula (1), the current $I_{151}$ is further coupled to a current mirror formed by transistors 156, 157, and 158, and generate a current $I_{157}$ and the current signal $I_T$. A common node of the transistors 156, 157, and 158 is coupled to the voltage $V_{CC}$. The current $I_{157}$ and the current signal $I_T$ are generated in accordance with the current $I_{151}$ when the limit temperature voltage $V_{LMT}$ is higher than the temperature signal $V_T$. The temperature signal $V_T$ decreases in response to the temperature increase of the temperature-sensing device 70.

The temperature signal $V_T$ is configured for generating a current signal (e.g., current $I_{151}$) for modulating the switching signal $S_W$ and the current-sensing signal $V_{CS}$. A current $I_{161}$ generated by the current source 161 determines a high limit value of temperature. When the current $I_{157}$ is higher than the current $I_{161}$, the value of the temperature signal of the temperature-sensing device is higher than a high limit value of temperature, and the inverter 165 will output a logic-low value to generate the signal $S_{ENB}$ after a delay time $T_D$ of the timer 170. The delay time $T_D$ is determined by a timer 170. When the temperature of the temperature-sensing device 70 is lower than the high limit value of temperature (determined by the current $I_{161}$) and is higher than the limit value of temperature (determined by the limit temperature voltage $V_{LMT}$), the switching signal $S_W$ will be modulated in accordance with the current signal $I_T$. The switching signal $S_W$, the output power $P_O$, and the output current $I_O$ of the power converter will be modulated and limited in response to the temperature of the temperature-sensing device 70, as expressed as formula (2) to (7).

$$E = 0.5 \times L_P \times I_P^2 \qquad (2)$$

$$P_O = 0.5 \times L_P \times I_P^2 \times F_{req} \qquad (3)$$

$$P_O = 0.5 \times L_P \times F_{req} \times \left(\frac{V_{LMT}}{R_S}\right)^2 \qquad (4)$$

$$P_O = 0.5 \times L_P \times F_{req} \times \left[\frac{V_{LMI} - M_0 \times (V_{LMT} - I_B \times R_T)}{R_S}\right]^2 \qquad (5)$$

$$V_O \times I_O = 0.5 \times L_P \times F_{req} \times \left[\frac{V_{LMI} - M_0 \times (V_{LMT} - I_B \times R_T)}{R_S}\right]^2 \qquad (6)$$

$$I_O = 0.5 \times L_P \times F_{req} \times \left[\frac{V_{LMI} - M_0 \times (V_{LMT} - I_B \times R_T)}{R_S}\right]^2 \times \frac{1}{V_O} \qquad (7)$$

In formulas (2) to (7), $L_P$ is the inductance of the primary winding of the transformer 10; $I_P$ is the switching current of the primary winding of the transformer 10; $F_{req}$ is the frequency of the switching signal $S_W$; $M_0$ is a constant; $I_B$ is the current of the current source 110; $V_O$ is the output voltage of the power converter; E is the output electromotive force; $R_T$ is the resistance of the temperature-sensing device 70, and $R_T$ has a negative temperature coefficient. Thus, the output current $I_O$ and the output power $P_O$ of the power converter linearly decrease in response to the temperature increase of the temperature-sensing device 70 in FIG. 1 when the temperature of the temperature-sensing device is higher than the limit value of temperature.

Figure 4:
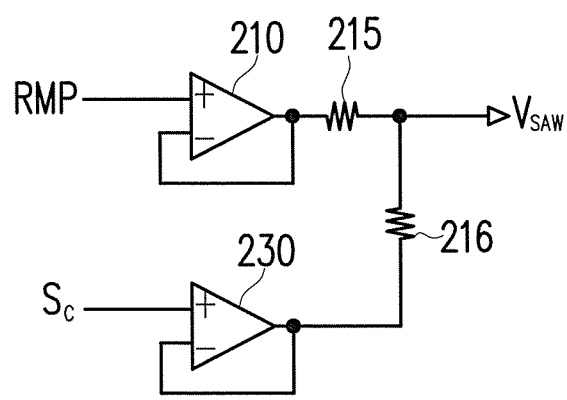
FIG. 4 shows a circuit diagram illustrating the slope circuit 200 of the control circuit 50 according to one embodiment of the present invention.

FIG. 4 shows a circuit diagram illustrating the slope circuit 200 of the control circuit 50 according to one embodiment of the present invention. The slope circuit 200 comprises buffers 210 and 230, and resistors 215 and 216. The positive input node of the buffer 210 is coupled to the ramp signal RMP, and the negative input node of the buffer 210 is coupled to the output node of the buffer 210. The output node of the buffer 210 is also coupled to one node of the resistor 215. The positive input node of the buffer 230 is coupled to the modulated signal $S_C$, and the negative input node of the buffer 230 is coupled to the output node of the buffer 230. The output node of the buffer 230 is also coupled to one node of the resistor 216. Another node of the resistor 215 is coupled to Another node of the resistor 216 for generating the saw-tooth signal $V_{SAW}$. The relationship of the saw-tooth signal $V_{VSAW}$, the ramp signal RMP and the modulated signal $S_C$ could be expressed as formula (8) showing below.

$$V_{SAW} = \left(\frac{R_{216}}{R_{215} + R_{216}} \times RMP\right) + S_C \qquad (8)$$

Figure 5:
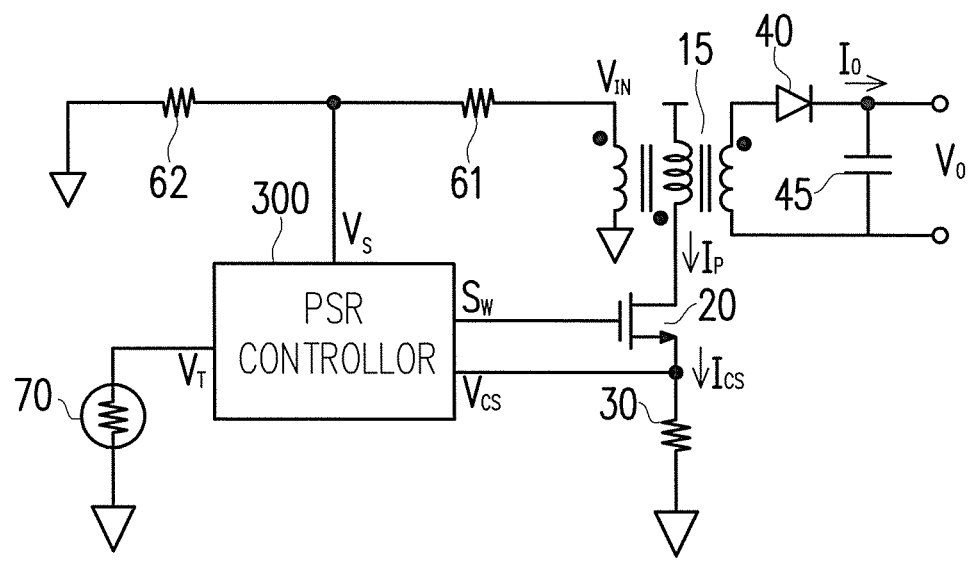
FIG. 5 shows a circuit diagram illustrating a power converter according to another embodiment of the present invention.

FIG. 5 shows a circuit diagram illustrating a power converter according to another embodiment of the present invention, which is a primary-side regulation power converter. The primary-side regulation power converter comprises a primary-side regulation (PSR) controller 300, a temperature-sensing device 70, resistors 61, 62, and 30, a transformer 15, a transistor 20, a rectifier 40, and a capacitor 45. The primary-side regulation controller 300 generates a switching signal $S_W$ in accordance with a transformer signal $V_S$ for regulating the output voltage $V_O$ and the output current $I_O$. The transformer signal $V_S$ is correlated to the output voltage $V_O$. The output current $I_O$ is correlated to the transformer signal $V_S$ and the current-sensing signal $V_{CS}$. The temperature-sensing device 70 generates a temperature signal $V_T$ to the primary-side regulation controller 300 for temperature control and protection.

Figure 6:
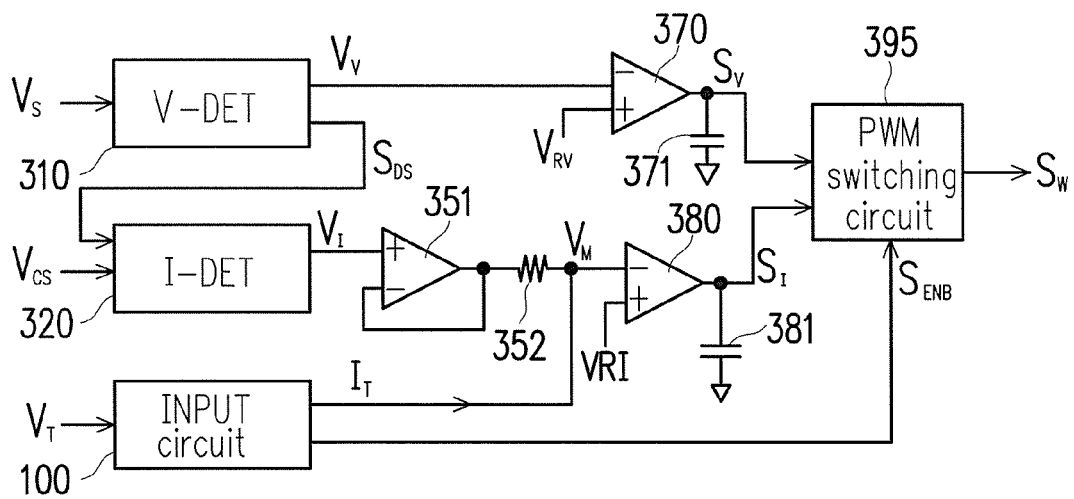
FIG. 6 shows a circuit diagram illustrating the primary-side regulation controller 300 of the power converter according to one embodiment of the present invention.

FIG. 6 shows a circuit diagram illustrating the primary-side regulation controller 300 of the power converter according to one embodiment of the present invention. The primary-side controller comprises a voltage feedback circuit (V-DET) 310, a current feedback circuit (I-DET) 320, an input circuit 100, a buffer amplifier 351, error amplifiers 370 and 380, a PWM switching circuit 395, and capacitors 371 and 381. The voltage feedback circuit 310 generates a voltage feedback signal $V_V$ and a demagnetizing time signal $S_{DS}$ according to the transformer signal $V_S$. The voltage feedback signal $V_V$ is coupled to an error amplifier 370 for generating a voltage loop signal $S_V$ according to a reference $V_{RV}$. The capacitor 371 is configured for the loop compensation.

The current feedback circuit 320 generates a current feedback signal $V_I$ according to the current-sensing signal $V_{CS}$ and the demagnetizing time signal $S_{DS}$. A modulated signal $V_M$ is generated in accordance with the current feedback signal $V_I$ through a buffer amplifier 351 and a resistor 352. The modulated signal $V_M$ is coupled to an error amplifier 380 for generating a current loop signal $S_I$ according to a reference $V_{RI}$. A capacitor 381 is configured for the loop compensation. The voltage loop signal $S_V$ and the current loop signal $S_I$ are coupled to a PWM switching circuit 395 to generate the switching signal $S_W$. The relationship between the current-sensing signal $V_{CS}$ and the current feedback signal $V_I$ could be expressed as formula (9) showing below.

$$V_I = K_1 \times \frac{V_{CS} \times T_{DS}}{T} \quad (9)$$

The relationship between the output current $I_O$ and $I_{CS}$ could be expressed as formula (10) showing below.

$$I_O = N \times \frac{I_{CS} \times T_{DS}}{T} \quad (10)$$

In formulas (9) and (10), $T_{DS}$ is the period of the demagnetizing time signal $S_{DS}$; T is the switching period of the switching signal $S_W$; $K_1$ is a constant; N is a turn ratio, a proportion of the turns of the primary winding and that of the secondary winding, of the transformer 15; $I_{CS}$ is the primary switching current of the transformer 15 shown in FIG. 5, and $I_{CS}$ is configured for generating the current-sensing signal $V_{CS}$.

The current feedback signal $V_I$ and the output current $I_O$ can be expressed as formulas (11) and (12).

$$V_1 = K_1 \times (I_{CS} \times R_S) \times \frac{T_{DS}}{T} = K1 \times \left(\frac{I_O}{N} \times R_S\right) = V_{RI} \quad (11)$$

$$I_O = K_0 \times \frac{V_{RI}}{R_S} \quad (12)$$

In formulas (11) and (12), $R_S$ is the resistance of the current-sensing resistor 30; $K_0$ is a constant.

The output current $I_O$ is determined by the reference $V_{RI}$ and the resistance of the current-sensing resistor 30 when the temperature of the temperature-sensing device 70 is lower than the limit temperature voltage. The primary-side controller 300 will control the switching signal $S_W$ to regulate the output current $I_O$ of the power converter. In other words, the primary-side regulation controller 300 is configured for regulating the output power from a primary side of the power converter.

The modulated signal $V_M$ is generated in accordance with the current-sensing signal $V_{CS}$ and the current signal $I_T$. The current signal $I_T$ is generated in accordance with the temperature signal $V_T$ in the input circuit 100 when the temperature of the temperature-sensing device 70 is higher than the limit value of temperature. The switching signal $S_W$ will be modulated in response to the temperature of the temperature-sensing device 70. The output current $I_O$ will linearly decreases when the temperature increases, and the formula (13) of the output current $I_O$ shows as follows.

$$I_O = K_0 \times \left[\frac{V_{RI} - M_0 \times (V_{LMT} - I_B \times R_T)}{R_S}\right] \quad (13)$$

In Formula (13), $M_0$ is a constant; $I_B$ is the current of the current source 110; $R_T$ is the resistance of the temperature-sense device 70 and is a negative temperature coefficient.

The input circuit 100 further generates the signal $S_{ENB}$ coupled to the PWM circuit to disable the switching signal $S_W$ if the temperature is higher than the high limit value of temperature.

Figure 7:
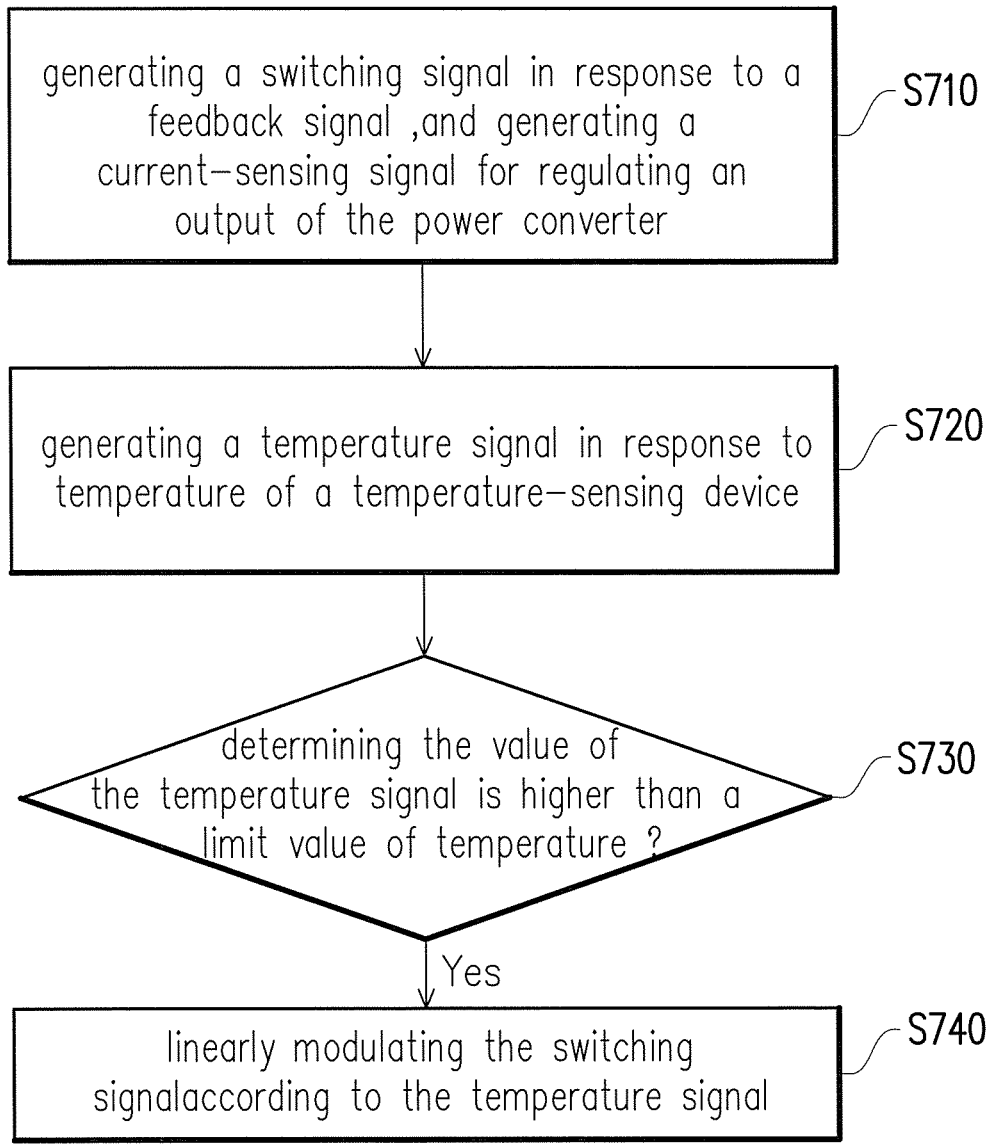
FIG. 7 shows a flowchart illustrating a method for controlling a power converter according to one embodiment of the present invention.

FIG. 7 shows a flowchart illustrating a method for controlling a power converter according to one embodiment of the present invention. The method for controlling the power converter is configured for the power converter of FIG. 1 and FIG. 5. Each step of the method for controlling the power converter is described herein. Referring to the FIG. 1 and FIG. 7, in step S710, the control circuit 50 and/or the PSR controller 300 generates a switching signal $S_W$ in response to a feedback signal (e.g., the current-sensing signal $V_{CS}$ or the transformer signal $V_S$), and the control circuit 50/the PSR controller 300 generates the current-sensing signal $V_{CS}$ for regulating the output current/power of the power converter. In step S720, the temperature-sensing device 70 generates a temperature signal $V_T$ in response to the temperature of the temperature-sensing device 70. In step S730, the control circuit 50 and/or the PSR controller 300 determine the value of the temperature signal is higher than a limit value of temperature. When the value of the temperature signal is higher than a limit value of temperature, from step S730 to the step S740, the control circuit 50 and/or the PSR controller 300 linearly modulates the switching signal $S_W$ according to the temperature signal $V_T$. The steps are described in detail at the above embodiments of the present invention.

Although the present invention and the advantages thereof have been described in detail, it should be understood that various changes, substitutions, and alternations can be made therein without departing from the spirit and scope of the invention as defined by the appended claims. That is, the discussion included in this invention is intended to serve as a basic description. It should be understood that the specific discussion may not explicitly describe all embodiments possible; many alternatives are implicit. The generic nature of the invention may not fully explained and may not explicitly show that how each feature or element can actually be representative of a broader function or of a great variety of alternative or equivalent elements. Again, these are implicitly included in this disclosure. Neither the description nor the terminology is intended to limit the scope of the claims.

What is claimed is:
1. A control circuit of a power converter, comprising:
 a switching circuit generating a switching signal in response to a feedback signal, and generating a current-sensing signal for regulating an output of the power converter; and a temperature-sensing device generating a temperature signal in response to temperature of the temperature sense device, wherein the temperature signal is configured for linearly modulating the switching signal when a value of the temperature signal is higher than a limit value of temperature, in which the temperature signal is configured for turning off the switching signal after a delay time when the value of the temperature signal of the temperature-sensing device is higher than a high limit value of temperature.

2. The control circuit as claimed in claim 1, in which an output current of the power converter linearly decreases in response to a temperature increase of the temperature-sensing device when the temperature of the temperature-sensing device is higher than the limit value of temperature.

3. The control circuit as claimed in claim 1, in which an output power of the power converter linearly decreases in response to a temperature increase of the temperature-sensing device when the temperature of the temperature-sensing device is higher than the limit value of temperature.

4. The control circuit as claimed in claim 1, in which the control circuit is configured for regulating an output power from a primary side of the power converter.

5. The control circuit as claimed in claim 1, in which the temperature signal is configured for generating a current signal for modulating the switching signal and the current-sensing signal.

6. A method for controlling a power converter, comprising:
generating a switching signal in response to a feedback signal, and generating a current-sensing signal for regulating an output of the power converter;
generating a temperature signal in response to temperature of a temperature-sensing device; and
when the value of the temperature signal is higher than a limit value of temperature, linearly modulating the switching signal according to the temperature signal,
in which the temperature signal is configured for turning off the switching signal after a delay time when the temperature of the temperature-sensing device is higher than a high limit value of temperature.

7. The method as claimed in claim 6, in which an output current of the power converter linearly decreases in response to a temperature increase of the temperature-sensing device when the temperature of the temperature-sensing device is higher than the limit value of temperature.

8. The method as claimed in claim 6, in which an output power of the power converter linearly decreases in response to a temperature increase of the temperature-sensing device when the temperature of the temperature-sensing device is higher than the limit value of temperature.

9. The method as claimed in claim 6, in which the power converter is regulated from a primary side of the power converter.

10. The method as claimed in claim 6, in which the temperature signal is configured for generating a current signal for modulating the switching signal and the current-sensing signal.

* * * * *